United States Patent Office 3,226,354
Patented Dec. 28, 1965

3,226,354
ADHESIVE PRODUCTS OF POLYISOCYANATES AND POLYISOTHIOCYANATES
Herbert L. Heiss, Cider Run, New Martinsville, W. Va., assignor to Monsanto Company, St. Louis, Mo., a corporation of Delaware
No Drawing. Continuation of application Ser. No. 373,035, Aug. 7, 1953. This application Sept. 28, 1959, Ser. No. 842,593
21 Claims. (Cl. 260—31.2)

This application is a continuation of application Serial No. 373,035, filed August 7, 1953, and now abandoned, which was a continuation-in-part of application Serial No. 300,968, filed July 25, 1952, and now abandoned.

This invention relates to organic chemical compositions and particularly to polymeric compounds.

This invention has as an object the provision of an improved method of preparing polyhydric materials. A further object of the invention is to provide an improved method of producing polymeric materials from organic polyisocyanates and/or polyisothiocyanates and organic materials containing a plurality of active hydrogen atoms, whereby the rate at which these materials react together is greatly increased. Another object is the preparation of polymeric materials which can be utilized in the manufacture of films, fibers and plastics. A still further object of the invention is to provide polymeric materials having improved curing and bonding properties over those obtainable by methods of the prior art. Other objects and advantages will appear hereinafter as the description of the invention proceeds.

The foregoing objects are achieved by reacting, in the presence of a catalyst of the type hereinafter specified, an organic compound having a plurality of but preferably two separate and distinct reactive groups of the formula —NCX wherein X is selected from the group consisting of oxygen and sulfur, with an organic substance having a plurality of groups, each of which contains reactive hydrogen. The reactive hydrogen is that detected and determined by the Zerewitinoff method. When the reactants are bifunctional, i.e., when one reactant contains two groups of the formula —NCX and the other reactant contains two groups with reactive hydrogen, the products are usually linear polymers. When one of the reactants is already polymeric, the product is a modified polymer of high molecular weight.

In producing polymeric materials by the method of the instant invention, there is employed a catalyst which is selected from the group consisting of compounds capable of yielding in aqueous solution ionizable hydroxyl- or substituted hydroxyl groups and precursors of these compounds. The expression "substituted hydroxyl groups" signifies radicals of the formula —OX, in which X is a member selected from the group consisting of aliphatic, cycloaliphatic, aryl, alkaryl, aralkyl and substituted hydrocarbon radicals which may or may not be interrupted by non-reactive hetero atoms such as sulfur and oxygen, etc. For example, these hydrocarbon radicals may be substituted by alkyl, alkoxy, halogen and/or nitro groups. Illustrative examples of suitable catalysts are the oxides or hydroxides of alkali and alkaline earth metals such as potassium, sodium, calcium, barium and strontium; the oxides of zinc and lead; the alkali metal salts and particularly the sodium and potassium salts of substituted phenols such as orthophenyl phenol, 2,4,5-trichlorophenol and 2,3,4,6-tetrachlorophenol; and quaternary ammonium bases such as benzyl trimethylammonium hydroxide, tetramethylammonium hydroxide, tetramethylphenylammonium hydroxide, tetraethylammonium hydroxide, etc. These catalysts are used alone or in combination with tertiary organic amines such as N-methylmorpholine, N-ethylmorpholine, triethylamine, tripropylamine, tributylamine, triamylamine, pyridine and quinoline, etc. The sodium salts of the substituted phenols are most preferred.

The present invention is illustrated by the following examples, wherein parts given are by weight. There are, of course, many other forms of the invention other than these specific embodiments.

Example 1

13.8 parts of a polyethylene glycol having an average molecular weight of about 400 was mixed with about 12 parts of m-tolylene diisocyanate and the ensuing reaction allowed to proceed without the addition of heat until the reactants yielded a solidified resinous polymer.

The foregoing procedure was repeated except that the reaction was carried out in the presence of varying amounts of benzyltrimethylammonium hydroxide, the purpose being to determine the effect of this catalyst on the reaction rate between the glycol and the diisocyanate.

The quantities of benzyltrimethylammonium hydroxide and the maximum reaction temperatures and reaction times employed are set forth below:

| Percent Benzyltrimethylammonium Hydroxide | Maximum Temperature, °C. | Reaction time, Minutes |
|---|---|---|
| 0 | 80 | 12 |
| .05 | 84 | 10 |
| .1 | 85 | 7 |
| .12 | 91 | 7 |
| .125 | 93 | 7 |
| .13 | 126 | 6 |
| .1325 | 146 | 5 |
| .15 | 142 | 3 |

These experimental data clearly demonstrate that the rate of reaction between the polyethylene glycol and diisocyanate is greatly increased by means of benzyltrimethylammonium hydroxide and that the rate of increase increases with the concentration of the catalyst.

Example 2

Approximately 12 parts of m-tolylene diisocyanate and about 13.8 parts of a polyethylene glycol having an average molecular weight of about 400 were reacted together at room temperature in the presence of a sufficient amount of ethyl acetate to yield a 50 percent solution of the corresponding adduct. Samples of this solution were converted to a more highly polymerized state by continuing the reaction in the presence of moisture and in the presence and absence of catalysts, the purpose being to determine the effect of the catalyst on the curing rate. The catalyst used, the amount of catalyst and the results obtained are given in the following table:

| Adduct Solution No. | Catalyst | Curing Time at Room Temperature, Minutes |
|---|---|---|
| 1 | None | ≥330 |
| 2 | 2.5% by Wt. of N-methylmorpholine | >300 |
| 3 | 0.08% Benzyltrimethylammonium Hydroxide | 120 |
| 4 | 0.08% Benzyltrimethylammonium Hydroxide and 2.5% N-methylmorpholine | 30 |
| 5 | 0.2% Benzyltrimethylammonium Hydroxide | 120 |
| 6 | 0.2% Benzyltrimethylammonium Hydroxide and 2.5% N-methylmorpholine | 30 |
| 7 | 0.64% Benzyltrimethylammonium Hydroxide and 2.5% N-methylmorpholine | 25 |
| 8 | 0.2% Benzyltrimethylammonium Hydroxide and 5% N-methylmorpholine | 10 |

The experimental data given in this table clearly demonstrate that N-methylmorpholine and benzyltrimethylammonium hydroxide markedly increase the rate at which the reactants are converted to a resinous solid polymer. They also show that the use of N-methylmorpholine in combination with benzyltrimethylammonium hydroxide products a synergistic effect in that the rate of reaction thus obtained is greater than the sum of the individual effects.

*Example 3*

Samples of the adduct solutions designated 1 and 8 in Example 2 were used as adhesives in laminating ½″ x ¼″ x 1⅜″ aluminum plates. In producing these products, the surfaces of an aluminum foil were coated with the adhesive and then the coated foil was inserted between the aluminum plates. The resulting assembly was heated while under slight pressure at a temperature of about 175° C. for 5 minutes or until the polymer fused. The product prepared in this manner were subjected to an increasing load applied perpendicularly to the plane of lamination until the sheets separated. The load at which failure occurred is set forth below:

| Adduct No. | Load of Failure Lbs./Sq. In. |
|---|---|
| 1 | About 600. |
| 8 | About 1,600. |

This example demonstrates in a very striking manner that the use of catalysts in reacting a polyethylene glycol with an organic diisocyanate results in the production of an adhesive having greatly increased bond strength over a similar adhesive produced in the absence of a catalyst.

*Example 4* m-Tolylene diisocyanate and the condensate of about 6.6 mols of propylene oxide with 1 mol of glycerine were reacted together in a weight ratio of about 7.85 parts of the diisocyanate to about 7.15 parts of the condensate, the reaction taking place in the presence of a sufficient amount of chlorinated biphenyl containing 42 percent chlorine to yield a 50 percent solution of adduct. On continuing the reaction by heating for 2¼ hours at 140° C., a sample of this solution yielded a tough, rubbery and resinous gel.

The procedure just described was followed except that 1 percent by weight of calcium oxide was added to a sample of the solution of adduct. On continuing the reaction by heating the sample at 140° C. for 10 minutes, it was converted initially into a gel and finally into a porous resinous foam.

This example demonstrates that the rate at which the glycol is converted by the diisocyanate to a resinous polymer is greatly accelerated by the use of calcium oxide.

*Example 5* m-Tolylene diisocyanate containing about 0.23 percent of hydrolyzable chlorine was reacted with the condensate of about 3.1 mols of propylene oxide with 1 mol of glycerine in a weight ratio of 9.86 parts of the isocyanate to about 5.14 parts of the condensate, the reaction taking place in the presence of sufficient amount of chlorinated biphenyl containing 42 percent chlorine to yield a 50 percent solution of the adduct. The reaction was continued by heating the solution at 150° C. for 3 hours and a gel was formed which, on continued heating for a total of 23 hours at the same temperature, produced a flexible, bubble-free resin.

The foregoing procedure was repeated except that about 1 percent by weight of lead oxide was added to a sample of the solution of adduct and the reaction continued by heating at 140° C. for about 1¼ to 1¾ hours. This resulted in the conversion of the solution into a gel and finally into a rubbery resinous foam.

This example demonstrates that the use of lead oxide greatly increases the rate at which the condensate is converted by the diisocyanate into a solid resinous product.

*Example 6*

About 23.4 parts of m-tolylene diisocyanate was added, with agitation, to a solution of about 26.7 parts of a polyethylene glycol having an average molecular weight of about 400 in about 50 parts of anhydrous benzene. After the ensuing reaction subsided, about 2.5 parts of N-methylmorpholine was added. A sample of this product was applied as a film to the surface of glass and the reaction continued until the solution was converted to a non-tacky stage.

The procedure just described was repeated except that about 0.01 percent by weight of KOH was added to the polyethylene glycol used in the reaction.

The periods of time required to convert the sample solutions to a non-tacky stage were as follows:

| | Conversion time, minutes |
|---|---|
| Sample prepared without KOH catalyst | 500 |
| Sample prepared with KOH catalyst | About 20 |

Samples of the solutions of intermediate reaction product prepared in the foregoing manner were used to coat a 0.001 inch aluminum foil which in turn was employed as an interlayer in forming laminated aluminum plates. The laminated plates were prepared by assembling the interlayer between the plates and then subjecting the assembly to a temperature of 175° C. and a pressure of about 50 lbs./sq. in. The laminated products thus prepared were subject to an increasing load applied perpendicularly to the plane of lamination until the sheets separated. The load at which failure occurred is set forth below:

| Laminated product: | Load of failure, lbs./sq. in. |
|---|---|
| Prepared from adhesive made without catalyst | About 500 |
| Prepared from adhesive made with catalyst | >2000 |

This example demonstrates that the use of KOH results in the production of an adhesive having greatly increased bond strength over a similar adhesive produced in the absence of KOH.

The invention is applicable to the reaction of compounds having a plurality of groups containing reactive hydrogen, as determined by the Zerewitinoff method, with a compound having a plurality of separate and distinct groups of the formula —NCX wherein X is a member selected from the group consisting of oxygen and sulfur. Compounds containing a plurality of —NCX groups include diisocyanates, triisocyanates, diisothiocyanates and triisothiocyanates, etc., as well as compounds of the mixed functions such as the isocyanate-isothiocyanates.

The preferred compounds are those having two groups of the formula —NCX and of these the diisocyanates and diisothiocyanates in general are most useful in the practice of this invention and form a preferred subclass because of their ease of preparation, low cost, reactivity, etc. Additional examples of this preferred subclass are ethylene diisocyanate, trimethylene diisocyanate, tetramethylene diisocyanate, pentamethylene diisocyanate, etc.; and the corresponding diisothiocyanates; alkylene diisocyanates and diisothiocyanates, such as propylene-1,2-diisocyanate, butylene-1,2-diisocyanate, butylene-1,3-diisocyanate, butylene-2,3-diisocyanate, and butylene-1,3-diisothiocyanate; alkylidene diisocyanates and diisothiocyanates, such as ethylidine diisocyanate, butylidine diisocyanate and ethylidine diisothiocyanate; cycloalkylene diisocyanates and diisothiocyanates, such as cyclopentylene-1,3-diisocyanate, cyclohexylene-1,2-diisocyanate, cyclohexylene-1,3-diisocyanate, cyclohexylene-1,4-diisocyanate, and cyclohexylene-1,2-diisothiocyanate; cycloalkylidene diisocyanates and diisothiocyanates, such as cyclopentylidene diisocyanates, cyclohexylidene diisocyanate and cyclohexylidene diisothiocyanate; aromatic diisocyanates and diisothiocyanates, such as m-phenylene diisocyanate, p-phenylene diisocyanate, 1-methyl-2-4-phenylene diisocyanate, naphthyl isocyanate, 1-methyl-2,4-phenylene diisocyanate, naphthylene-1,4-diisocyanate, diphenylene-4,4'-diisocyanate or p-phenylene diisothiocyanate; aliphatic-aromatic diisocyanates or diisothiocyanates, such as sylylene-1,4-diisocyanate, xylylene-1,3-diisocyanate, 4,4'-diphenylenemethane diisocyanate, 4,4'-diphenylene-propane diisocyanate or xylylene-1,4-diisothiocyanate; and diisocyanates and diisothiocyanates containing hetero atoms, such as $SCNCH_2O$ $CH_2NCS$, and $SCNCH_2CH_2OCH_2CH_2NCS$ $SCN-N(R)-CS-N(R)-NCS$ In fact, any diisocyanate, diisothiocyanate, or mixed isocyanate-isothiocyanate of the general formula

XCNRNCX in which X is oxygen or sulfur and R is a divalent organic radical, will react with the reactive hydrogen compound to give polymers according to the present invention.

As examples of compounds containing more than two reactive groups of the formula —NCX, there may be mentioned butane 1,2,2-triisothiocyanate, 1,2,4-benzene triisothiocyanate, 4,4',4''-triphenylmethane triisothiocyanate, 2,4,4'-biphenyl triisothiocyanate, 1,4,7-naphthalene triisothiocyanate, 2,4,7-naphthalene triisothiocyanate, 4,4',4''-m-terphenyl triisothiocyanate, 4,4',4''-o-terphenyl triisothiocyanate, butane 1,2,2-triisocyanate, 1,2,4-benzene triisocyanate, 4,4',4'' - triphenylmethane triisocyanate, 2,4,4'-biphenyl triisocyanate, 1,4,7-naphthalene triisocyanate, 2,4,7-naphthalene triisocyanate, 4,4',4''-m-terphenyl triisocyanate and 4,4',4''-o-terphenyl triisocyanate, etc.

The invention is generic to compounds having a plurality of groups containing reactive hydrogen. Typical groups containing reactive hydrogen are hydroxyl, carboxyl, primary amino, secondary amino, amido, and mercapto groups, etc.

Illustrative examples of suitable compounds within these various groups are glycols such as ethylene glycol, propylene glycol, butylene glycol-2,3, butylene glycol-1,3, 2 - methylpentanediol - 2,4, 2-ethylhexanediol-1,3, hexamethylene glycol, styrene glycol, N-phenyl-diethanolamine, catechol, resorcinol, 2,2-bis(4-hydroxyphenyl) propane, p,p'-dihydroxybiphenyl, decamethylene glycol; polyglycols (ether glycols) such as polyethylene glycols, diethylene glycol, triethylene glycol, tetraethylene glycol, polyethylene glycols 200, 400 and 600; polypropylene glycols, dipropylene glycol, tripropylene glycol, polypropylene glycols 400, 750, 1200 and 2000; carbowaxes 1000, 1000W, 1500; monoethers of trihydroxy compounds such as glycerine-α-allyl ether, glyceryl-α-phenyl ether, glyceryl-α-isopropyl ether; hydroxy esters such as an ester prepared from 1 mol of dibasic acid and 2 mols of a glycol or polyglycol, a polyester prepared so that the molar ratio of glycol or polyglycol to the dibasic acid is between 2 and 1, an ester prepared from 1 mol of a dimer acid and 2 mols of a glycol or polyglycol, an ester prepared from a hydroxy acid and a glycol or polyglycol so that the molar ratio of the glycol or polyglycol to the hydroxy acid is between 0.5 and 1 and an ester prepared from 1 mol of a trihydroxy compound and 1 mol of a monobasic acid, such as the monoglyceride of eleostearic acid; trihydroxy compounds such as glycerine, triethanolamine, pyrogallol, phloroglucinol, etc., alkylene oxide condensates of glycerine, triethanolamine, pyrogallol, phloroglucinol, etc.; monoethers of tetrahydroxy compounds; esters prepared from hydroxy acid and a trihydroxy compound so that the molar ratio of the latter to the former is between 0.33 and 1, such as glycerine triricinoleate, esters prepared from 1 mol of a monobasic acid and 1 mol of a tetrahydroxy compound; tetrahydroxy compounds such as pentaerythritol, etc., alkylene oxide condensates of pentaerythritol, etc., esters prepared from 1 mol of a dibasic acid and 2 mols of a trihydroxy compound; pentahydroxy compounds, such as arabitol, xylitol, etc.; hexahydroxy compounds such as sorbitol, ducitol, mannitol; carboxyl compounds such as oxalic acid, malonic acid, pimelic acid, suberic acid, azelaic acid, decane-1,10-dicarboxylic acid, itaconic acid, itamalic acid, cyclopentane-1,3-dicarboxylic acid, cyclohexane-1,2-dicarboxylic acid, cyclohexane-1,3-dicarboxylic acid, cyclohexane-1,4-dicarboxylic acid, diphenic acid, phthalic acid, isophthalic acid, terephthalic acid, naphthalene-1,2-dicarboxylic acid, naphthalene-1,3-dicarboxylic acid, naphthalene-1,4-dicarboxylic acid, naphthalene-1,5-dicarboxylic acid, diphenylene-2,2'-dicarboxylic acid, diphenylene-4,4'-dicarboxylic acid, diphenylene-2,4'-dicarboxylic acid, xylylene-1,4-dicarboxylic acid, xylylene-1,3-dicarboxylic acid, xylylene-1,2-dicarboxylic acid, citric acid, tartaric acid, tricarballylic acid, polyacrylic acid, etc.; amines such as ethylene diamine, trimethylene diamine, tetramethylene diamine, hexamethylene diamine, octamethylene diamine, decamethylene diamine, dodecamethylene diamine, N,N'-dimethyl decamethylene diamine, N,N'-dibenzyl hexamethylene diamine, cyclohexylene-1,4-diamine, o-phenylene diamine, m-phenylene diamine, p-phenylene diamine, benzidine, naphthalene-1,4-diamine, gamma,gamma'-diamino-dibutyl oxide, gamma,gamma'-diamino-dibutyl sulfide, diethylene triamine, triethylene tetramine, amides such as phthalamide, isophthalamide, terephthalamide, malonamide, succinamide, adipamide, etc. and the corresponding imides; mercaptans such as dimercapto-ethane, 1,2,3-trimercaptopropane, 1,2,3-trimercaptobutane, 1,5-dimercapto - 3 - mercaptomethylpentane, 1,6-dimercaptohexane, 1,10-dimercaptodecane, 1,6-dimercapto-3-methylhexane, 1,4-dimercaptobenzene, dimercaptoxylylene, dimercaptoresorcinol and polyvinyl mercaptan; and polyvinyl alkylene sulfides such as the thiokols.

Illustrative examples of polymeric materials having active hydrogen-containing groups which may be employed in the practice of this invention are hydroxylated organic materials such as cellulose; starch; dextrine; wood; cellulose derivatives containing hydroxyl, amino or other active hydrogen-containing groups including among others cellulose esters such as acetate, propionate, butyrate and nitrate; cellulose mixed esters; cellulose ethers such as methyl or ethyl cellulose; carboxylated cellulose; and regenerated cellulose; polyvinyl alcohol and polyvinyl alcohol derivatives such as partially hydrolyzed polyvinyl acetate or polyvinyl proprionate; polyvinyl acetal; polyvinyl ketals; and polyhydric alcohol-polybasic acid condensation products (alkyd resins) with free hydroxyl or carboxyl groups.

Resins obtained by the condensation of formaldehyde with such materials as phenols, amides (including ureas and sulfonamide), aldehydes, ketones, aromatic ethers, aromatic hydrocarbons, carbamates and amines may be used.

Nitrogen-containing polymeric materials are particularly useful. For example, polyester-amides such as the condensation product of ethanolamine, adipic acid and ethylene glycol, or the condensation product of hexamethylene-diamine, adipic acid and ethylene glycol, or, in general, polymers formed by condensing a polyamine, a polybasic acid and polyhydric alcohol. Low or high molecular weight polyamides such as polyhexamethylene adipamide, polydecamethylene adipamide, 6-aminocaproic acid polymer, and the like may be used. Protein and protein-like materials such as gelatin, casein, zein and leather; gums such as copal, Congo, kauri, shellac and dammar; and polymerized or gelled drying oils of the linoxyn type are also suitable.

Ether resins, for example, those prepared by reacting organic polyhalides with polyhydric phenols as described in U.S. Patent 2,060,175, and polymeric derivatives of acrylic, methacrylic or fumaric acid may also be used as polymeric organic materials containing active hydrogen atoms.

Active hydrogen-containing vulcanizable materials may be employed including aldehyde treated natural and synthetic rubbers, for example, those disclosed in U.S. Patents 1,915,808 and 1,640,363 and British Patent 486,878, rubber di-(hydroxy phenyl), and hydroxylated rubbers, e.g., the peracetylated rubbers and hydrolyzed peracetylated rubbers described in U.S. Patent 1,988,448. The term rubber as used herein includes natural rubber, balata, gutta percha, modified rubber, neoprene, and the various butadiene and substituted butadiene polymers and interpolymers.

The organic compounds having a plurality of groups containing reactive hydrogen comprise compounds of the formula $R^2(QH)_x$, wherein $R^2$ is a polyvalent radical of valence $x$, $x$ is an integer greater than 1, Q is a bivalent group linking the reactive hydrogen through a polyvalent inorganic element such as oxygen, sulfur or nitrogen.

The reaction between the organic compound containing a plurality of separate and distinct groups having the formula —NCX wherein X is a member of the class consisting of oxygen and sulfur with an organic substance having a plurality of groups containing reactive hydrogen atoms, may be carried out either in the presence or absence of solvents, diluents or plasticizers and at atmospheric, superatmospheric or subatmospheric pressures. The reaction is preferably conducted in the absence of oxygen or moisture, which may be achieved either by operating in a partial vacuum or in the presence of an inert gas such as nitrogen. In most cases, the reaction proceeds at ordinary temperatures, but, if desired, higher temperatures may be employed. The above reaction does not require high temperatures and in general it is advantageous to operate below 200° C.

The reaction of an organic compound of the general formula: $R(NCX)_n$ with an organic polyhydroxy compound, particularly at organic dihydroxy compound, in the presence of a low boiling inert organic solvent, that is, a solvent boiling below 200° C. at atmospheric pressure, results in the production of a solution of reaction product, which cures at a relatively slow rate. This solution is activated by the addition of about 0.001 percent to about 5 percent by weight of a catalyst of the class mentioned above. This activated solution finds use as an adhesive or in protective coatings or in applications where it is desirable to apply a liquid to a surface and then allow it to cure or harden into a solid. For example, this solution may be used to adhesively bind various bases together such as wood to wood, glass to glass, fiber board to fiber board, cloth to cloth, paper to paper, regenerated cellulose to regenerated cellulose, cellulose esters to cellulose esters, cellulose ethers to cellulose ethers, gelatin to gelatin, mica to mica, steel to steel, steel to aluminum, steel to cellulose acetate, steel to acrylic plastics, steel to vinyl plastics, steel to wood and various combinations of these and other bases.

In the production of laminated products, the activated solution is applied to one or both of the laminae, after which the laminae are assembled and the solution allowed to cure at room temperature while being subjected to pressure. If desired, the curing may be accelerated by subjecting the assembly to heat and pressure until the polymerization of the above organic compound has been carried substantially to completion.

The adhesives prepared in the presence of catalysts in accordance with this invention have novel and completely unexpected properties in that they are characterized by possessing a greatly accelerated curing rate and markedly improved bond strengths over similar adhesives prepared in the absence of a catalyst.

In the production of adhesives in accordance with this invention, the reactants are employed in the proportions providing a ratio of —NCX groups to active hydrogen atoms which falls substantially in the range of about 1:1 to about $n$:1. More specifically, the reactants are employed in the proportions providing a ratio of —NCX groups to active hydrogen atoms which falls in the range of about 1.3:1 or 1.5:1 to about $n$:1, and preferably in the range of about 2:1 to about $n$:1.

As indicated earlier herein, an inert organic solvent boiling at a temperature below 200° C. and preferably below 150° C. at atmospehric pressure is employed in carrying out the reaction. Illustrative examples of solvents suitable for use in this reaction are benzene, toluene, xylene, carbon tetrachloride, acetone, methyl ethyl ketone, ethyl acetate and amyl acetate. However, it is to be understood that the invention is not restricted to these materials as other equivalent inert organic solvents may be employed.

Polymers containing mixed organic radicals may be prepared by reacting a compound of the formula $XCNR^3NCX$ with a compound of the formula $H-Q-R^2-Q-H$ wherein $R^2$ and $R^3$ are different organic radicals. Moreover, interpolymers may be prepared by reacting two or more different compounds of the formula $H-Q-R^2-Q-H$ with a single compound of the formula $XCNRNCX$ or vice versa.

The proportions of reactants used in the practice of the instant invention may fluctuate widely since the invention resides primarily in the use of the catalysts hereinbefore mentioned to substantially increase the rate of reaction. In general, the reactants are employed in a molar ratio of the organic compound containing —NCX groups to the active hydrogen-containing organic compound, which falls substantially in the range of about 1:1 to about 3:1 or vice versa, and within this range a molar ratio of the former to the latter of about 2:1 is preferred. However, it is to be understood that the invention is not restricted to these molar ratio ranges.

The catalysts used in the practice of the instant invention are employed in an amount varying from about 0.001 percent to about 5 percent by weight or, more specifically, within the range of about .01 percent to about 3 percent by weight and within these limits about .05 percent to about 1 percent is perferred. The percentage by weight is based upon the weight of the total reactants.

The products of the instant invention find use in the production of films, fibers, textile finishing agents for improving the water repellency of treated fabrics, bristles and coating or molding compositions, bubble-free resins, resinous foams, potting resins, protective coatings, paints, varnishes, lacquers, laminated products, vibration, suppressors, radomes, abrasive articles, sound insulators, heat insulators, electrical insulators, condensers, coated electrical conductors, coil forms, stand-off insulators, insulating rods and bushings, coil mounting strips, insulating beads for coaxial cables, safety glass, plastic articles, packaging materials, adhesives, and numerous other commercially attractive products.

The term "chalcogen" is a group name for the elements oxygen, sulfur, selenium and tellurium and of these, the first two have an atomic weight less than 33.

As many apparently widely different embodiments of this invention may be made without departing from the spirit and scope thereof, it is to be understood that this invention is not limited to the specific embodiments thereof except as defined in the appended claims.

What is claimed is:

1. As a new composition of matter, an adhesive composition of greatly accelerated curing rate comprising a solution in an organic solvent boiling below about 200° C. at atmospheric pressure of an organic material obtained by reacting a compound of the general formula: $R(NCX)_n$ wherein R is an organic radical free from functional groups other than —NCX groups, X is selected from the group consisting of oxygen and sulfur, and $n$ is an integer having a value of at least 2, with an organic compound having as the only groups reactive with an —NCX group at least two groups selected from the group consisting of hydroxyl, carboxyl, primary amino, secondary amino and mercapto groups, said solution containing from about 0.001 percent to about 5 percent by weight of a catalyst selected from the group consisting of the oxides and hydroxides of alkali and alkaline earth metals; the oxides of zinc and lead; the alkali metal salts of substituted phenols; and the uncomplexed quaternary ammonium compounds.

2. As a new composition of matter, an adhesive composition of greatly accelerated curing rate comprising a solution in an organic boiling below about 150° C. at atmospheric pressure of an organic material obtained by reacting a compound of the general formula: $R(NCO)_n$ wherein R is an organic radical free from functional groups other than —NCO groups, and $n$ is an integer having a value of at least 2, with an organic compound having as the only groups reactive with an —NCO group at least two groups selected from the group consisting of hydroxyl, carboxyl, primary amino, secondary amino and mercapto groups, said solution containing from about 0.001 percent to about 5 percent by weight of a catalyst selected from the group consisting of the oxides and hydroxides of alkali and alkaline earth metals; the oxides of zinc and lead; the alkali metal salts of substituted phenols; and the uncomplexed quaternary ammonium compounds.

3. As a new product, a plurality of laminae bonded together by the cured adhesive defined in claim 1.

4. The method of making nonporous polyurethanes which comprises reacting an organic diisocyanate with a polyoxyalkylene glycol in the presence of an organic solvent boiling below 200° C. at atmospheric pressure and from about 0.001 percent to about 5 percent by weight of a catalyst selected from the group consisting of the oxides and hydroxides of alkali and alkaline earth metals; the oxides of zinc and lead; the alkali metal salts of substituted phenols; and the uncomplexed quaternary ammonium compounds.

5. The method of making nonporous polyurethanes which comprises reacting an organic diisocyanate with a polyethylene glycol in the presence of an inert organic solvent boiling below 200° C. at atmospheric pressure and from about 0.01 percent to 3 percent by weight of a catalyst comprising benzyltrimethylammonium hydroxide.

6. The method of making nonporous polyurethanes which comprises reacting an organic diisocyanate with a propylene oxide-glycerine condensate in the presence of an inert organic solvent boiling below 200° C. at atmospheric pressure and from about 0.01 percent to about 3 percent by weight of a catalyst selected from the group consisting of the oxides and hydroxides of alkali and alkaline earth metals; the oxides of zinc and lead; the alkali metal salts of substituted phenols; and the uncomplexed quaternary ammonium compounds.

7. A a new composition of matter, an adhesive composition of greatly accelerated curing rate comprising a solution in an inert organic solvent boiling below 200° C. at atmospheic pressure of an organic material obtained by reacting an organic diisocyanate with a polyoxyalkylene glycol, said solution containing about 0.001 percent to about 5 percent by weight of a catalyst selected from the group consisting of the oxides and hydroxides of alkali and alkaline earth metals; the oxides of zinc and lead; the alkali metal salts of substituted phenols; and the uncomplexed quaternary ammonium compounds.

8. In a method for making nonporous polyurethane plastics by a process which comprises reacting an organic compound having at least two groups selected from the group consisting of hydroxyl, carboxyl, primary amino, secondary amino and mercapto groups, said groups being the only groups reactive with an —NCX group, with an organic compound having as its sole reactive groups a plurality of separate and distinct groups having the formula —NCX wherein X is selected from the group consisting of oxygen and sulfur, the improved method of effecting the said reaction comprising carrying out the said reaction in the presence of from about 0.001 percent to about 5 percent by weight of a catalyst selected from the group consisting of the oxides and hydroxides of alkali and alkaline earth metals; the oxides of zinc and lead; the alkali metal salts of substituted phenols; and uncomplexed quaternary ammonium compounds.

9. In a method for making nonporous polyurethane plastics by a process which comprises reacting an organic compound having at least two hydroxyl groups as its only reactive groups with an —NCX group, with an organic compound having as its sole reactive groups a plurality of separate and distinct groups having the formula —NCX wherein X is selected from the group consisting of oxygen and sulfur, the improved method of effecting the said reaction comprising carrying out the said reaction in the presence of from about 0.001 percent to about 5 percent by weight of a catalyst selected from the group consisting of the oxides and hydroxides of alkali and alkaline earth metals; the oxides of zinc and lead; the alkali metal salts of substituted phenols; and uncomplexed quaternary ammonium compounds.

10. In a method for making nonporous polyurethane plastics by a process which comprises reacting an organic compound having at least two groups selected from the group consisting of hydroxyl, carboxyl, primary amino, secondary amino and mercapto groups, said groups being the only groups reactive with an —NCX group, with an organic compound having as its sole reactive groups a plurality of separate and distinct groups having the formula —NCX wherein X is selected from the group consisting of oxygen and sulfur, the improved method of effecting the said reaction which comprises bringing the said components together along with an inert organic solvent for the resulting adduct having a boiling point below about 200° C. and from about 0.001 percent to about 5 percent by weight of a catalyst selected from the group consisting of the oxides and hydroxides of alkali and alkaline earth metals; the oxides of zinc and lead; the alkali metal salts of substituted phenols; and uncomplexed quaternary ammonium compounds.

11. The method of claim 8 wherein the —NCX groups are —NCO groups.

12. The method of claim 8 wherein the —NCX groups are —NCS groups.

13. In a method for making nonporous polyurethane plastics by a process which comprises reacting a polyoxyalkylene glycol with an organic compound having as its sole reactive groups a plurality of separate and distinct groups having the formula —NCX wherein X is selected from the group consisting of oxygen and sulfur, the improved method of effecting the said reaction comprising carrying out the said reaction in the presence of from about 0.001 percent to about 5 percent by weight of a catalyst selected from the group consisting of the oxides and hydroxides of alkali and alkaline earth metals; the oxides of zinc and lead; the alkali metal salts of substituted phenols; and uncomplexed quaternary ammonium compounds.

14. A method for making a nonporous polyurethane containing biuret and allophanate groups along with urethane linkages which comprises reacting a polyether glycol, with an organic compound having as its sole reactive groups at least two separate and distinct groups having the formula —NCX wherein X is selected from the group consisting of oxygen and sulfur in the presence of from about 0.001 percent to about 5 percent by weight of a compound which promotes formation of allophanates and biurets and is selected from the group consisting of the oxides and hydroxides of alkali and alkaline earth metals, the oxides of zinc and lead, the alkali metal salts of substituted phenols; and uncomplexed quaternary ammonium compounds.

15. A method for making a nonporous polyurethane containing biuret and allophanate groups along with urethane linkages which comprises reacting an organic compound having at least two groups selected from the group consisting of hydroxyl, carboxyl, primary amino, secondary amino, and mercapto groups, with an organic compound having as its sole reactive groups at least two separate and distinct groups having the formula —NCX wherein X is selected from the group consisting of oxygen and sulfur in an inert organic solvent for the resulting reaction product, said solvent having a boiling point below about 200° C. and selected from the group consisting of hydrocarbons, chloro hydrocarbons, ketones and esters in the presence of from about 0.001 percent to about 5 percent by weight of a compound which promotes formation of allophanates and biurets and is selected from the group consisting of the oxides and hydroxides of alkali and alkaline earth metals, the oxides of zinc and lead, the alkali metal salts of substituted phenols, and uncomplexed quaternary ammonium compounds.

16. The composition of claim 1 wherein R is hydrocarbon.

17. The composition of claim 1 wherein R is aliphatic.

18. The composition of claim 1 wherein R is aromatic.

19. The composition of claim 1 wherein $n$ is 2–3.

20. The product of claim 3 wherein said laminae are glass.

21. As a new composition of matter, an adhesive composition of greatly accelerated curing rate comprising a solution in an organic solvent boiling below about 200° C. at atmospheric pressure of an organic material obtained by reacting a compound of the general formula: $R(NCX)_n$ wherein R is an organic radical free from functional groups other than —NCX groups, X is selected from the group consisting of oxygen and sulfur, and $n$ is an integer having a value of at least 2, with an organic compound having as the only groups reactive with an —NCX group at least two groups selected from the group consisting of hydroxyl, carboxyl, primary amino, secondary amino and mercapto groups, said solution containing from about 0.001 percent to about 5 percent by weight of a sodium salt of a substituted phenol.

References Cited by the Examiner

UNITED STATES PATENTS

| | | | |
|---|---|---|---|
| 2,512,671 | 6/1950 | Novotny et al. | 260—32.8 |
| 2,730,518 | 1/1956 | Birley et al. | 260—75 |
| 2,798,859 | 7/1957 | Bruce | 260—75 |
| 2,879,251 | 3/1959 | Seegar et al. | 260—75 |
| 2,948,691 | 8/1960 | Windemuth et al. | 260—33.6 |

FOREIGN PATENTS

| | | |
|---|---|---|
| 649,928 | 2/1951 | Great Britain. |
| 808,285 | 7/1951 | Germany. |
| 509,608 | 3/1952 | Belgium. |

OTHER REFERENCES

De Bell, German Plastics Practice, Murray Printing Co., 1946, pp. 300–316, and 472–473.

MORRIS LIEBMAN, *Primary Examiner.*

DANIEL ARNOLD, ALEXANDER H. BRODMERKEL, *Examiners.*